United States Patent
Pattan et al.

(10) Patent No.: US 11,343,657 B2
(45) Date of Patent: May 24, 2022

(54) SYSTEM AND METHOD FOR CLIENT PROTOCOL SELECTION FOR SHORT DATA SERVICE

(71) Applicant: Samsung Electronics Co., Ltd, Suwon-si (KR)

(72) Inventors: Basavaraj Jayawant Pattan, Bangalore (IN); Ricky Kumar Kaura, Middlesex (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 232 days.

(21) Appl. No.: 16/497,435

(22) PCT Filed: Mar. 26, 2018

(86) PCT No.: PCT/KR2018/003516
§ 371 (c)(1),
(2) Date: Sep. 24, 2019

(87) PCT Pub. No.: WO2018/174675
PCT Pub. Date: Sep. 27, 2018

(65) Prior Publication Data
US 2021/0321229 A1 Oct. 14, 2021

(30) Foreign Application Priority Data

Mar. 24, 2017 (IN) .............................. 201741010504
Mar. 22, 2018 (IN) .............................. 201741010504

(51) Int. Cl.
*H04W 4/14* (2009.01)
*H04W 4/06* (2009.01)
*H04W 24/02* (2009.01)

(52) U.S. Cl.
CPC ............. *H04W 4/14* (2013.01); *H04W 24/02* (2013.01)

(58) Field of Classification Search
CPC ..... H04L 67/06; H04L 63/08; H04L 65/1006; H04L 65/1073; H04L 65/4076;
(Continued)

(56) References Cited

U.S. PATENT DOCUMENTS 8,311,567 B2   11/2012  Park et al.
10,313,057 B2 *  6/2019  Lin ................... H03M 13/2933
(Continued)

FOREIGN PATENT DOCUMENTS

CN   101741857 A   6/2010
CN   102118526 A   7/2011
(Continued)

OTHER PUBLICATIONS

Supplementary European Search Report in connection with European Application No. 18771611.3 dated Jan. 27, 2020, 10 pages.
(Continued)

*Primary Examiner* — Khawar Iqbal

(57) ABSTRACT

Embodiments herein provide a method for managing short data service (SDS) communication in a mission critical data (MCData) communication system. The method includes determining, by a transmitting MCData UE, whether a pre-determined criteria is met for transmitting a one-to-one standalone SDS message or a group standalone SDS message to receiving MCData UE (s). Further, the method includes determining data size of the one-to-one standalone SDS message or group standalone SDS message. Furthermore, the method includes transmitting the one-to-one standalone SDS message to the receiving MCData UE for one-to-one communication or group communication using one of a signaling control plane and a media plane based the determined data size of the one-to-one standalone SDS message or group standalone SDS message.

4 Claims, 5 Drawing Sheets

(58) Field of Classification Search
CPC ......... H04L 67/02; H04L 67/28; H04L 69/14; H04L 69/16; H04L 69/26; H04L 67/12; H04L 69/08; H04L 29/06; H04L 29/08; H04W 4/02; H04W 4/06; H04W 4/14; H04W 24/02

See application file for complete search history.

(56) References Cited

U.S. PATENT DOCUMENTS

| | | | | |
|---|---|---|---|---|
| 10,382,196 | B2* | 8/2019 | Shields | H04L 63/0428 |
| 10,863,576 | B2* | 12/2020 | Pattan | H04L 65/1006 |
| 2015/0381381 | A1 | 12/2015 | Dyson | |
| 2017/0374109 | A1* | 12/2017 | Atari | H04L 65/1016 |
| 2018/0103468 | A1* | 4/2018 | Li | H04B 7/14 |
| 2018/0227103 | A1* | 8/2018 | Wang | H04L 5/0053 |
| 2019/0058551 | A1* | 2/2019 | Li | H04W 74/0833 |
| 2019/0334969 | A1* | 10/2019 | Ge | H04L 65/4061 |
| 2020/0187294 | A1* | 6/2020 | Ge | H04W 76/45 |
| 2021/0058096 | A1* | 2/2021 | Sun | H03M 13/35 |
| 2021/0126726 | A1* | 4/2021 | Parkvall | H04W 8/18 |
| 2021/0212054 | A1* | 7/2021 | Xiong | H04W 72/0413 |
| 2021/0227026 | A1* | 7/2021 | Rubenstein | H04L 67/2842 |
| 2021/0250843 | A1* | 8/2021 | Baek | H04W 40/22 |

FOREIGN PATENT DOCUMENTS

| | | |
|---|---|---|
| CN | 103152700 A | 6/2013 |
| CN | 104159165 A | 11/2014 |

OTHER PUBLICATIONS

Samsung, "Conditions for using SDS media plane," S6-170153 (revision of S6-170098), 3GPP TSG-SA WG6 Meeting #15, Jeju Island, South Korea, Feb. 13-17, 2017, 3 pages.

3GPP TS 23.282 V14.0.0 (Dec. 2016), Technical Specification, 3rd Generation Partnership Project; Technical Specification Group Services and System Aspects; Functional architecture and information flows to support Mission Critical Data (MCData); Stage 2 (Release 14), Dec. 2016, 70 pages.

3GPP TS 24.282 V0.1.0 (Jan. 2017), Technical Specification, 3rd Generation Partnership Project; Technical Specification Group Core Networks and Terminals; Mission Critical Data (MCData) signalling control; Protocol specification (Release 14), Jan. 2017, 28 pages.

China National Intellectual Property Administration, "The First Office Action" dated Mar. 18, 2021, in connection with Chinese Patent Application No. 201880020661.7, 19 pages.

"3rd Generation Partnership Project; Technical Specification Group Core Networks and Terminals; Mission Critical Data (MCData) signalling control; Protocol specification (Release 14)", 3GPP TS 24.282 V0.1.0 (Jan. 2017), 28 pages.

Samsung, "Pseudo-CR on Group SDS via signalling plane client procedures", 3GPP TSG-CT WG1 Meeting #102, Feb. 13-17, 2017, C1-171058, 5 pages.

Motorola Solution, Airwave, "The mapping and the meaning of the MCData configuration data for Transmission and Reception control", 3GPP TSG CT WG1 Meeting #102, Feb. 13-17, 2017, C1-170799, 3 pages.

"3rd Generation Partnership Project; Technical Specification Group Core Networks and Terminals; Mission Critical Data (MCData) media plane control; Protocol specification (Release 14)", 3GPP TS 24.582 V0.2.0 (Mar. 2017), 17 pages.

"3rd Generation Partnership Project; Technical Specification Group Core Network and Terminals; Mission Critical Data (MCData) signalling control; Protocol specification (Release 15)", 3GPP TS 24.282 v15.2 0 (Jun. 2018), 235 pages.

Airbus DS SLC, "MCData Cplane SDS procedure selection criterion", 3GPP TSG-CT WG1 Meeting #110, Apr. 16-20, 2018, C1-182569, 4 pages.

Airbus DS SLC, "Maximum payload size for an MCData-SDS over C-plane", 3GPP TSG-CT WG1 Meeting #110, Apr. 16-20, 2018, C1-182113, 7 pages.

Airbus DS SLC, "MCData Cplane SDS procedure selection criterion", 3GPP TSG-CT WG1 Meeting #110, Apr. 16-20, 2018, C1-182568, 4 pages.

Airbus DS SLC, "Maximum payload size for an MCData-SDS over C-plane", 3GPP TSG-CT WG1 Meeting #110, Apr. 16-20, 2018, C1-182114, 7 pages.

International Search Report dated Jul. 13, 2018 in connection with International Patent Application No. PCT/KR2018/003516, 3 pages.

Written Opinion of the International Searching Authority dated Jul. 13, 2018 in connection with International Patent Application No. PCT/KR2018/003516, 6 pages.

Patent Office of the Peoples Republic of China, "Notification of the Decision to Grant" dated Mar. 23, 2022, in connection with Chinese Patent Application No. 20180020661.7, 7 pages.

* cited by examiner

[Fig. 1A]
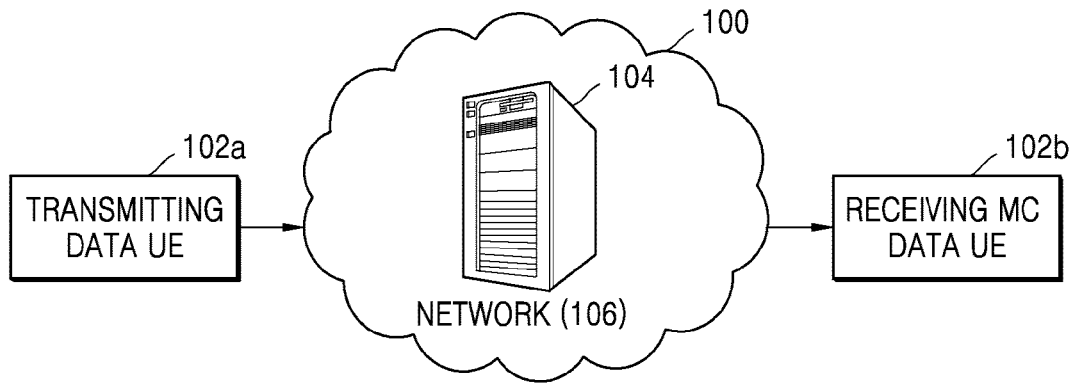
[Fig. 1B]
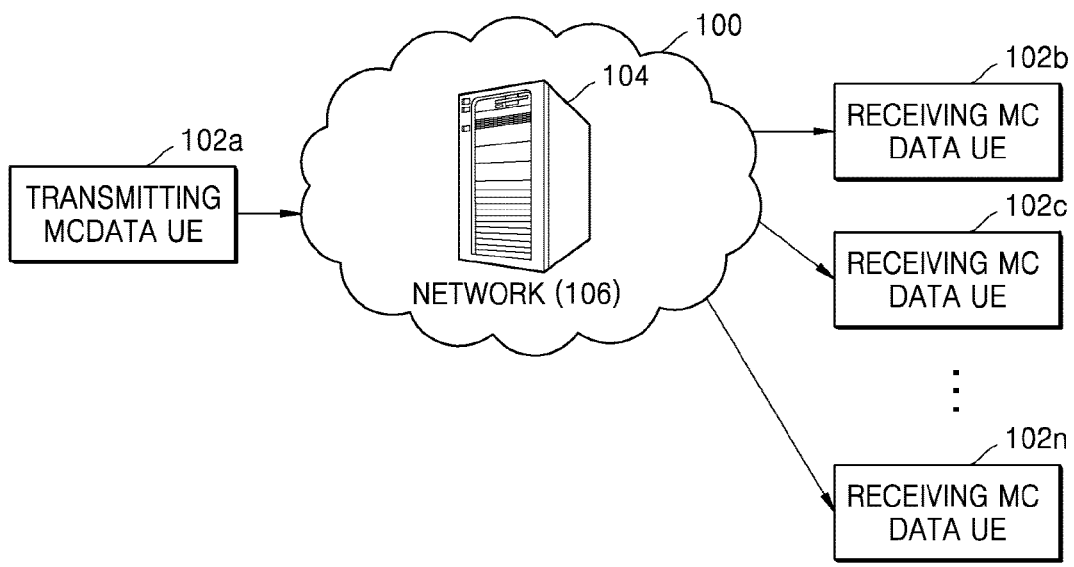
[Fig. 1C]
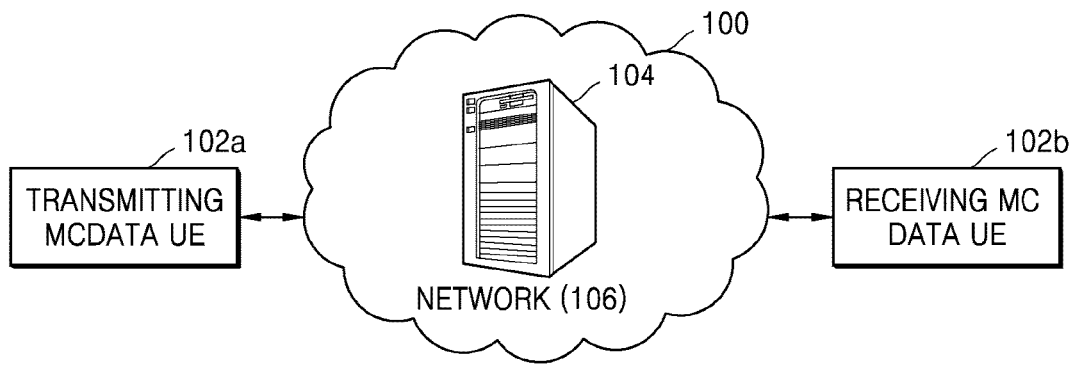

[Fig. 1D]
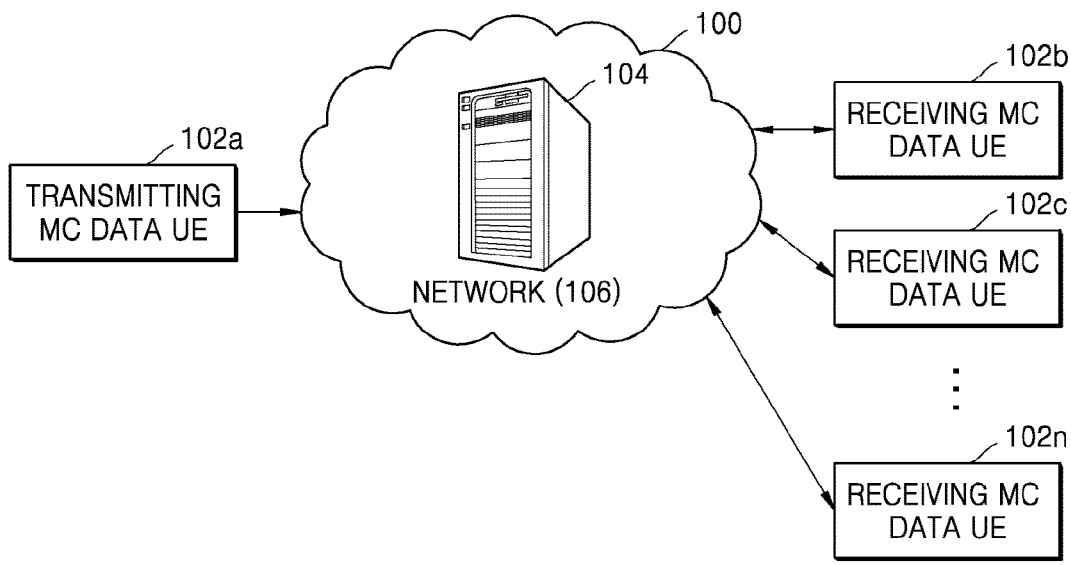
[Fig. 2]
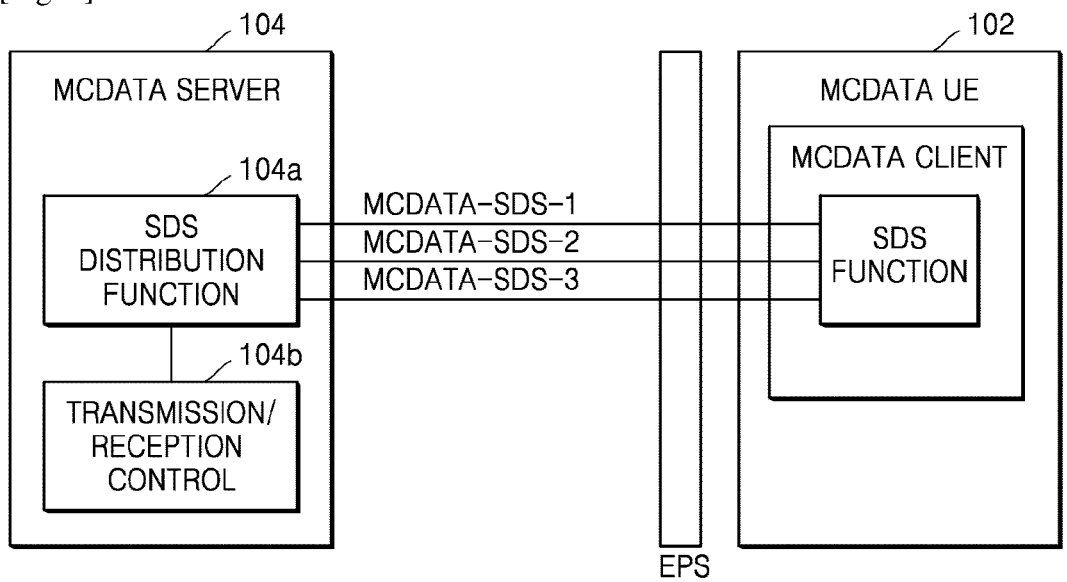
[Fig. 3]
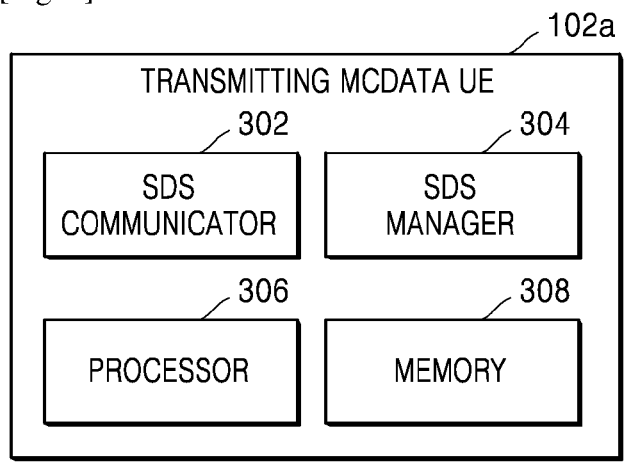

[Fig. 4]
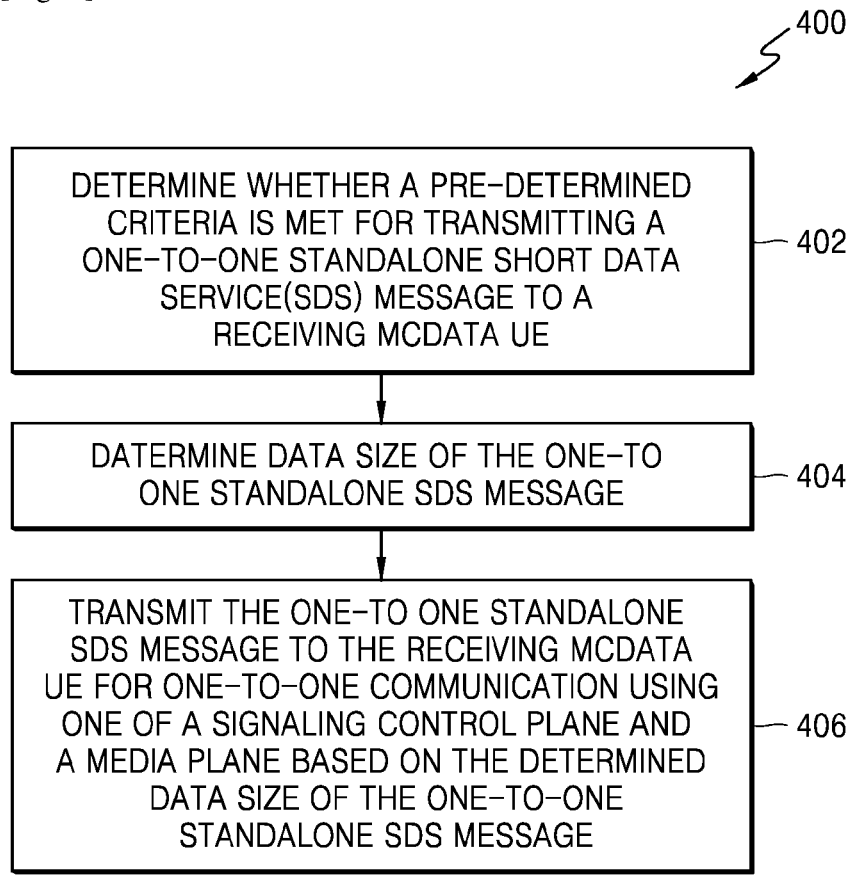

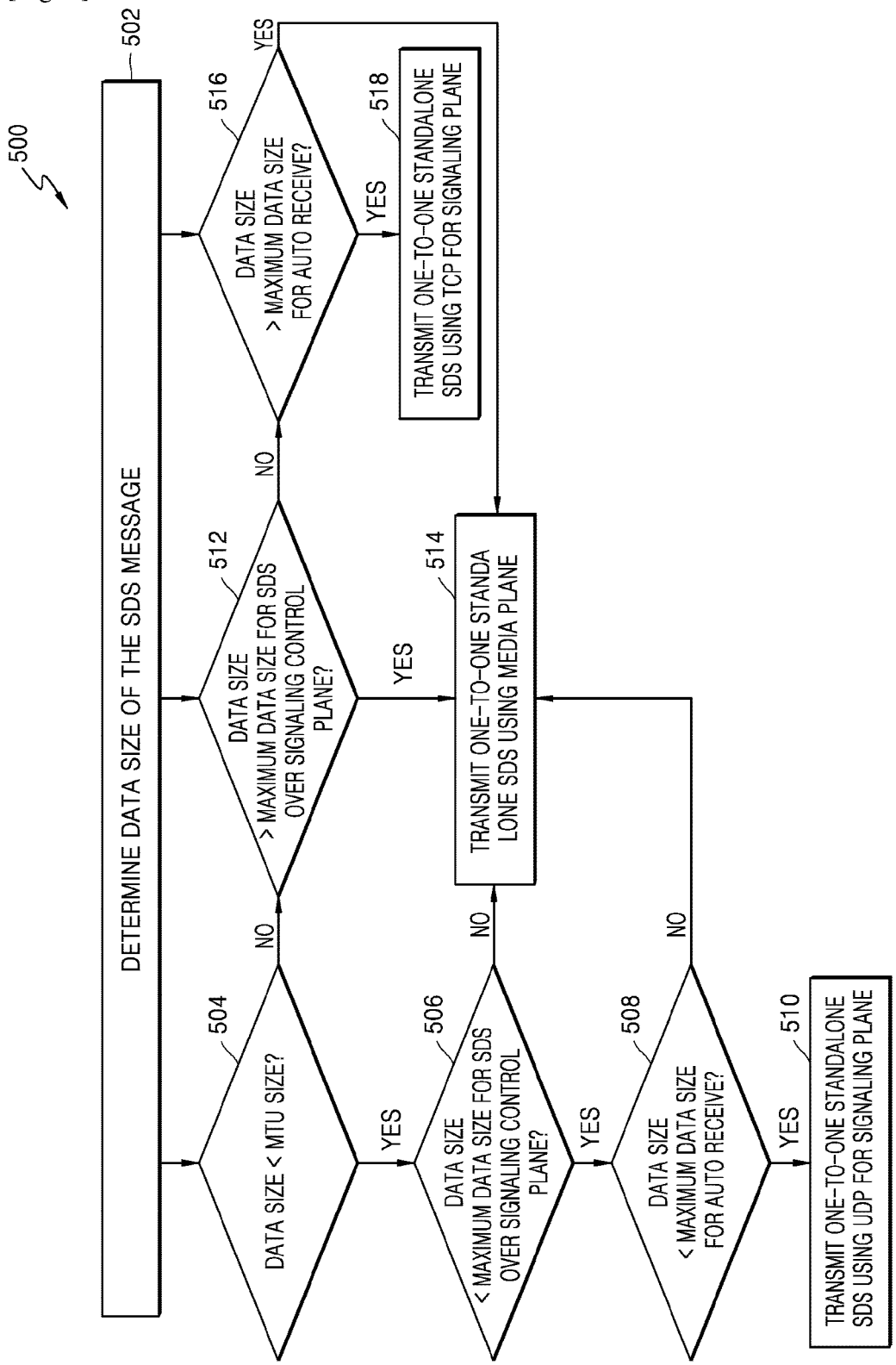
[Fig. 5]

[Fig. 6]
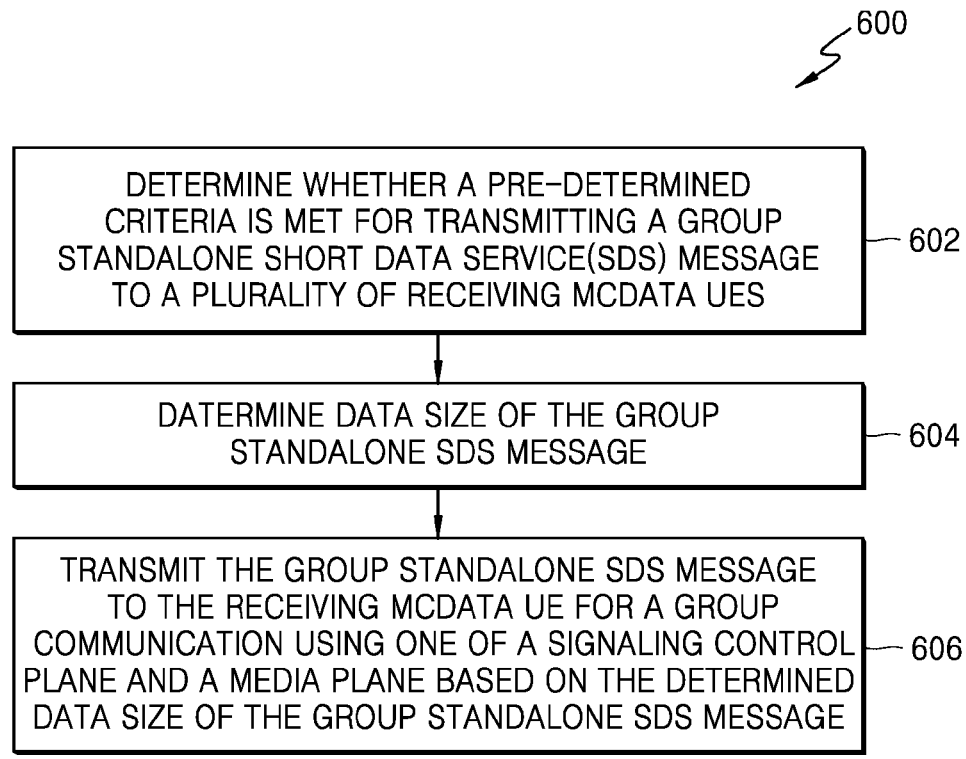
[Fig. 7]
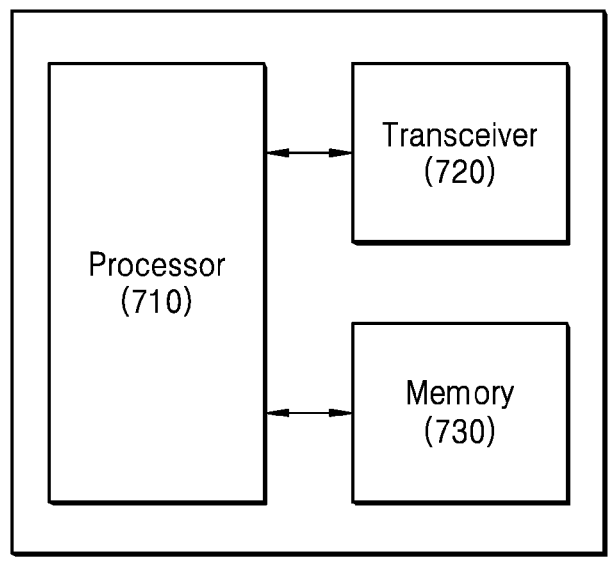

SYSTEM AND METHOD FOR CLIENT PROTOCOL SELECTION FOR SHORT DATA SERVICE

CROSS-REFERENCE TO RELATED APPLICATIONS

This application is a 371 of International Application No. PCT/KR2018/003516 filed on Mar. 26, 2018, which claims priority to India Patent Application No. 201741010504 filed on Mar. 24, 2017, and India Patent Application No. 201741010504 filed on Mar. 22, 2018, the disclosures of which are herein incorporated by reference in their entirety.

BACKGROUND

1. Field

The embodiments herein relate to Mission Critical Data (MCData) communication system, and more particularly relates to a method for managing short data service (SDS) communication in mission critical data (MCData) communication system. The present application is based on, and claims priority from an Indian Application Number 201741010504 filed on 24 Mar. 2017, the disclosure of which is hereby incorporated by reference herein.

2. Description of Related Art

Public safety networks are used for Mission Critical (MC) Data/Voice/Video communications. The MC communication may include defined set of MCData services. Such MCData services typically build on existing third generation partnership project (3GPP) transport communication mechanisms provided by the evolved packet system (EPS) architectures to establish, maintain, and terminate the actual communication path(s) among the users. Typically, a MCData server provides centralized support for such MCData services. The MCData server further can facilitate or govern MCData communication among various users part of the network.

In an alternate deployment, such MCData services can be off-network. In such deployments the MCData devices communicate directly with each other without a server for centralized support for the service.

The MCData services are designed to provide one-to-one, one-to-many, and group communications between users. In the present scenario, the public safety community requires services beyond voice i.e. data and video applications. MCData makes frequent use of a set of capabilities and enablers that allows for many end user services to be built on a common platform. A Short data service (SDS) feature is one such capability for use in the MCData Service. The SDS can be used on its own or in combination with other services, or may be used by other services to realize certain features such as sharing of a location, presence-like data, and command instructions to perform specific operations. The SDS functionality may include one-to-one messaging or one-to-many or group messaging.

With MCData SDS, a MCData User Equipment (UE) can send short data messages to other MCData users, both in on-network and in off-network. In addition, the SDS service may offer the ability to providing thread management to allow for multiple message flows. There are several methods how an SDS message can be transported from the sender to the recipient. If the originating MCData client does not select appropriate method then additional latency is introduced due to extra round trips by the Transmission and Reception Control on the MCData Server rejecting and the originating MCData client having to initiate with another method. Hence an effective system and methods which consider various factors and then for selecting an appropriate protocol and method is necessary for MCData SDS.

The above information is presented as background information only to help the reader to understand the present invention. Applicants have made no determination and make no assertion as to whether any of the above might be applicable as prior art with regard to the present application.

SUMMARY

The principal object of the embodiments herein is to provide a method and system for managing short data service (SDS) communication in a mission critical data (MCData) communication system Another object of the embodiments herein is to provide a method for determining whether a pre-determined criteria is met for transmitting a one-to-one standalone SDS message or a group standalone SDS message to a receiving MCData UE Another object of the embodiments herein is to provide a method for determining data size of the one-to-one standalone and the group standalone SDS message.

Another object of the embodiments herein is to provide a method for transmitting the one-to-one standalone SDS message or the group standalone SDS message to the receiving MCData UE for one-to-one communication and group communication using one of a signaling control plane and a media plane based on the determined data size of the one-to-one standalone SDS message or the group standalone SDS message.

Another object of the embodiments herein is to provide a method in which the transmitting MCData UE determines presence of the allow-to-transmit data in a MCData user profile configuration data for transmitting the one-to-one standalone SDS message to the receiving MCData UE.

Another object of the embodiments herein is to provide a method for transmitting the one-to-one standalone SDS message or group standalone SDS message using one of signaling control plane and media plane when the size of the one-to-one standalone or the group standalone SDS message is less than or greater than Maximum data size for SDS over signaling control plane.

Another object of the embodiments herein is to provide a method for transmitting the one-to-one standalone SDS message or the group standalone SDS message using User Datagram Protocol (UDP) for signaling control plane when the determined data size of the one-to-one standalone SDS message is less than MTU size and less than Maximum data size for SDS over signaling control plane.

Another object of the embodiments herein is to provide a method for transmitting the one-to-one standalone SDS message or group standalone SDS message using Transmission Control Protocol (TCP) for signaling control plane when the determined data size of the one-to-one standalone SDS message or group standalone SDS message is greater than MTU size and less than Maximum data size for SDS over signaling control plane.

Another object of the embodiments herein is to provide a method for method for transmitting the one-to-one standalone SDS message or group standalone SDS message using media plane when the data size of the one-to-one standalone SDS message or group standalone SDS message is greater than Maximum data size for SDS over signaling control plane.

Another object of the embodiments herein is to provide a method for transmitting the one-to-one standalone SDS message or group standalone SDS message using media plane when the data size of the one-to-one standalone SDS message is greater than maximum data size for automatically receiving the SDS message (maximum-data-size-for-auto-receive).

The proposed method and system provides an effective mechanism which considers various factors and then selects an appropriate protocol and method for MCData SDS. The proposed method allows selection of appropriate protocol by a MCData client at the transmitting MCData UE for SDS.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which:

FIGS. 1A-1D illustrate example on-network MCData communication systems for managing SDS communication, according to an embodiment as disclosed herein;

FIG. 2 is a functional model illustrating various entities in a MCData server and a MCData UE for an application plane in SDS communication, according to an embodiment as disclosed herein;

FIG. 3 is a block diagram illustrating various hardware components of a transmitting MCData UE for SDS communication, according to an embodiment as disclosed herein;

FIG. 4 is a flow chart illustrating a method for managing one-to-one SDS communication in the MCData communication system, according to an embodiment as disclosed herein;

FIG. 5 is a flow chart illustrating various steps involved in selection of signaling control plane or media plane for one-to-one SDS communication in the MCData communication system, according to an embodiment as disclosed herein; and FIG. 6 is a flow chart illustrating a method for managing group SDS communication in the MCData communication system, according to an embodiment as disclosed herein.

FIG. 7 is a block diagram illustrating the MCData UE according to an embodiment as disclosed herein.

DETAILED DESCRIPTION

Accordingly the embodiments herein provide a method for managing short data service (SDS) communication in a mission critical data (MCData) communication system, the method comprising:

determining, by a transmitting MCData UE, whether a pre-determined criteria is met for transmitting a one-to-one standalone SDS message to a receiving MCData UE;

determining data size of the one-to-one standalone SDS message; and transmitting the one-to-one standalone SDS message to the receiving MCData UE for one-to-one communication using one of a signaling control plane and a media plane based on the determined data size of the one-to-one standalone SDS message.

In an embodiment, the transmitting MCData UE determines the pre-determined criteria by determining presence of one or more MCData SDS transmission control parameters for the one-to-one SDS communication.

In an embodiment, the MCData SDS transmission control parameters comprises at least one of allow-to-transmit data, max-data-size-SDS-bytes and maximum amount of data for transmission in a single request.

In an embodiment, the transmitting MCData UE determines presence of the allow-to-transmit data in a MCData user profile configuration data for transmitting the one-to-one standalone SDS message to the receiving MCData UE.

In an embodiment, the transmitting MCData UE compares a size of the payload in the SDS message with a value associated with the max-data-size-SDS-bytes in MCData service configuration data for transmitting the one-to-one standalone SDS message to the receiving MCData UE.

In an embodiment, the transmitting MCData UE determines to transmit the one-to-one standalone SDS message to the receiving MCData UE when the data size of the payload in the SDS message is less than the value associated with the max-data-size-SDS-bytes.

In an embodiment, the transmitting MCData UE determines to transmit the one-to-one standalone SDS message to the receiving MCData UE in a single request message based on the data size of the payload of the SDS message.

In an embodiment, the transmitting MCData UE determines to transmit the one-to-one standalone SDS message to the receiving MCData UE in a single request when the size of the payload of the SDS message is within the maximum amount of data for transmission in a single request.

In an embodiment, the transmitting the one-to-one standalone SDS message to the receiving MCData UE using one of the signaling control plane and the media control plane based on the determined data size of the SDS message includes:

determining whether the data size of the one-to-one standalone SDS message is less than or greater than Maximum data size for SDS over signaling control plane;

transmitting the one-to-one standalone SDS message using one of the signaling control plane and the media plane in response to determining that the size of the one-to-one standalone SDS message is less than or greater than Maximum data size for SDS over signaling control plane.

In an embodiment, the one-to-one standalone SDS message is transmitted using User Datagram Protocol (UDP) for signaling control plane when the determined data size of the one-to-one standalone SDS message is less than MTU size and less than Maximum data size for SDS over signaling control plane.

In an embodiment, the one-to-one standalone SDS message is transmitted using Transmission Control Protocol (TCP) for signaling control plane when the determined data size of the one-to-one standalone SDS message is greater than MTU size and less than Maximum data size for SDS over signaling control plane.

In an embodiment, the one-to-one standalone SDS message is transmitted using media plane when the data size of the one-to-one standalone SDS message is greater than Maximum data size for SDS over signaling control plane.

In an embodiment, the transmitting MCData UE transmits the one-to-one standalone SDS message using media plane when the data size of the one-to-one standalone SDS message is greater than maximum data size for automatically receiving the SDS message (maximum-data-size-for-auto-receive).

Accordingly the embodiments herein provide a method for managing short data service (SDS) communication in a mission critical data (MCData) communication system, the method includes:

determining, by a transmitting MCData UE, whether a pre-determined criteria is met for transmitting a group standalone SDS message to a receiving MCData UE;

determining, by the transmitting MCData UE, data size of the group standalone SDS message; and transmitting, by the transmitting MCData UE, the group standalone SDS message to a plurality of receiving MCData UEs for a group communication using one of a signaling control plane and a media control plane based on the determined data size of the group standalone SDS message.

In an embodiment, the transmitting MCData UE determines the pre-determined criteria by determining presence of one or more MCData SDS transmission control parameters for group SDS communication.

In an embodiment, the MCData SDS transmission control parameters comprises mcdata-allow-transmit-data to the group, mcdata-on-network-max-data-size-for-SDS and maximum amount of data for transmission in a single request to the group.

In an embodiment, the transmitting MCData UE determines presence of the mcdata-allow-transmit-data to the group in MCData related group configuration data for transmitting the group standalone SDS message to the plurality of receiving MCData UEs.

In an embodiment, the transmitting MCData UE compares a size of the data in the SDS message with a value associated with the mcdata-on-network-max-data-size-for-SDS in MCData related group configuration data for transmitting the group standalone SDS message to the plurality of receiving MCData UEs.

In an embodiment, the transmitting MCData UE determines to transmit the group standalone SDS message to the plurality of receiving MCData UEs when the data size of the payload in the SDS message is less than the value contained in the mcdata-on-network-max-data-size-for-SDS.

In an embodiment, the transmitting MCData UE determines to transmit the group standalone SDS message to the plurality of receiving MCData UEs in a single request message based on size of the payload of the SDS message.

In an embodiment, the transmitting MCData UE determines to transmit the group standalone SDS message to the receiving MCData UEs in a single request when the data size of the payload of the SDS message is within the maximum amount of data for transmission in a single request.

In an embodiment, transmitting the group standalone SDS message to the receiving MCData UE using one of the signaling control plane and the media control plane based on the determined data size of the SDS message comprises:

determining whether the data size of the group standalone SDS message is less than or greater than Maximum data size for SDS over signaling control plane; and transmitting the one-to-one standalone SDS message using one of the signaling control plane and the media plane in response to determining that the size of the group standalone SDS message is less than or greater than Maximum data size for SDS over signaling control plane.

In an embodiment, the group standalone SDS message is transmitted using User Datagram Protocol (UDP) for signaling control plane when the determined data size of the one-to-one standalone SDS message is less than MTU size and less than Maximum data size for SDS over signaling control plane.

In an embodiment, the group standalone SDS message is transmitted using Transmission Control Protocol (TCP) for signaling control plane when the determined data size of the group standalone SDS message is greater than MTU size and less than Maximum data size for SDS over signaling control plane.

In an embodiment, the group standalone SDS message using media plane when the data size of the group standalone SDS message is greater than Maximum data size for SDS over signaling control plane.

In an embodiment, the transmitting MCData UE transmits the group standalone SDS message using media plane when the data size of the group standalone SDS message is greater than maximum data size for automatically receiving the SDS message (maximum-data-size-for-auto-receive).

Accordingly the embodiments herein provide a transmitting MCData UE for managing short data service (SDS) communication in a mission critical data (MCData) communication system. The transmitting Data UE comprises a SDS manager configured to:

determine whether a pre-determined criteria is met for transmitting a one-to-one standalone SDS message to a receiving MCData UE;

determine data size of the one-to-one standalone SDS message; and transmit the one-to-one standalone SDS message to the receiving MCData UE for one-to-one communication using one of a signaling control plane and a media plane based on the determined data size of the one-to-one standalone SDS message.

Furthermore, the SDS manager is configured to determine the pre-determined criteria by determining presence of one or more MCData SDS transmission control parameters for the one-to-one SDS communication.

Furthermore, the MCData SDS transmission control parameters comprises at least one of allow-to-transmit data, max-data-size-SDS-bytes and maximum amount of data for transmission in a single request.

Furthermore, the SDS manager is configured to determine presence of the allow-to-transmit data in a MCData user profile configuration data for transmitting the one-to-one standalone SDS message to the receiving MCData UE.

Furthermore, the SDS manager is configured to compare a size of the payload in the SDS message with a value associated with the max-data-size-SDS-bytes in MCData service configuration data for transmitting the one-to-one standalone SDS message to the receiving MCData UE.

Furthermore, the SDS manager is configured to determine to transmit the one-to-one standalone SDS message to the receiving MCData UE when the size of the payload in the SDS message is less than the value associated with the max-data-size-SDS-bytes.

Furthermore, the SDS manager is configured to determine to transmit the one-to-one standalone SDS message to the receiving MCData UE in a single request message based on the size of the payload of the SDS message.

Furthermore, the SDS manager is configured to determine to transmit the one-to-one standalone SDS message to the receiving MCData UE in a single request when the size of the payload of the SDS message is within the maximum amount of data for transmission in a single request.

Furthermore, the SDS manager is configured to transmitting the one-to-one standalone SDS message to the receiving MCData UE using one of the signaling control plane and the media control plane based on the determined size of the SDS message by:

determining whether the data size of the one-to-one standalone SDS message is less than or greater than Maximum data size for SDS over signaling control plane; and transmitting the one-to-one standalone SDS message using one of the signaling control plane and the media plane in response to determining that the data size of the one-to-one standalone SDS message is less than or greater than Maximum data size for SDS over signaling control plane.

Furthermore, the SDS manager is configured to transmit the group standalone SDS message using User Datagram Protocol (UDP) for signaling control plane when the determined data size of the one-to-one standalone SDS message is less than MTU size and less than Maximum data size for SDS over signaling control plane.

Furthermore, the SDS manager is configured to transmit the one-to-one standalone SDS message using Transmission Control Protocol (TCP) for signaling control plane when the determined data size of the group standalone SDS message is greater than MTU size and less than Maximum data size for SDS over signaling control plane.

Furthermore, the SDS manager is configured to transmit the group standalone SDS message using media plane when the data size of the group standalone SDS message is greater than Maximum data size for SDS over signaling control plane.

Furthermore, the SDS manager is configured to transmit the group standalone SDS message using media plane when the data size of the group standalone SDS message is greater than maximum data size for automatically receiving the SDS message (maximum-data-size-for-auto-receive).

Accordingly the embodiments herein provide a transmitting MCData UE for managing short data service (SDS) communication in a mission critical data (MCData) communication system. The transmitting MCData UE comprises a SDS manager configured to:

determine whether a pre-determined criteria is met for transmitting a group standalone SDS message to a receiving MCData UE;

determine data size of the group standalone SDS message; and transmit the group standalone SDS message to a plurality of receiving MCData UEs for a group communication using one of a signaling control plane and a media control plane based on the determined data size of the group standalone SDS message.

Furthermore, the SDS manager is configured to determine the pre-determined criteria by determining presence of one or more MCData SDS transmission control parameters for group SDS communication.

Furthermore, the MCData SDS transmission control parameters comprises mcdata-allow-transmit-data to the group, mcdata-on-network-max-data-size-for-SDS and maximum amount of data for transmission in a single request to the group.

Furthermore, the SDS manager is configured to determine presence of the mcdata-allow-transmit-data to the group in MCData related group configuration data for transmitting the group standalone SDS message to the plurality of receiving MCData UEs.

Furthermore, the SDS manager is configured to compare a size of the data in the SDS message with a value associated with the mcdata-on-network-max-data-size-for-SDS in MCData related group configuration data for transmitting the group standalone SDS message to the plurality of receiving MCData UEs.

Furthermore, the SDS manager is configured to determine to transmit the group standalone SDS message to the plurality of receiving MCData UEs when the size of the payload in the SDS message is less than the value contained in the mcdata-on-network-max-data-size-for-SDS.

Furthermore, the SDS manager is configured to determines to transmit the group standalone SDS message to the plurality of receiving MCData UEs in a single request message based on size of the payload of the SDS message.

Furthermore, the SDS manager is configured to determine to transmit the group standalone SDS message to the receiving MCData UEs in a single request when the size of the payload of the SDS message is within the maximum amount of data for transmission in the single request.

Furthermore, the SDS manager is configured to transmitting the group standalone SDS message to the receiving MCData UE using one of the signaling control plane and the media control plane based on the determined size of the SDS message by:

determining whether the data size of the group standalone SDS message is less than or greater than Maximum data size for SDS over signaling control plane; and transmitting the group standalone SDS message using one of the signaling control plane and the media plane in response to determining that the data size of the group standalone SDS message is less than or greater than Maximum data size for SDS over signaling control plane.

Furthermore, the SDS manager is configured to transmit the group standalone SDS message using User Datagram Protocol (UDP) for signaling control plane when the determined size of the group standalone SDS message is less than MTU size and less than Maximum data size for SDS over signaling control plane.

Furthermore, the SDS manager is configured to transmit the group standalone SDS message using Transmission Control Protocol (TCP) for signaling control plane when the determined data size of the one-to-one standalone SDS message is greater than MTU size and less than Maximum data size for SDS over signaling control plane.

Furthermore, the SDS manager is configured to transmit the group standalone SDS message using media plane when the data size of the group standalone SDS message is greater than Maximum data size for SDS over signaling control plane.

Furthermore, the SDS manager is configured to transmit the group standalone SDS message using media plane when the data size of the group standalone SDS message is greater than maximum data size for automatically receiving the SDS message (maximum-data-size-for-auto-receive).

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

MODE FOR INVENTION

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments. Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units or modules or the like, are physically implemented by analogue and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The term "transmitting" and "receiving" herein are used merely for labelling purpose and can be used interchangeably without departing from the scope of the embodiments. It should be noted that the embodiments in this disclosure are applicable to one-to-one communication and group communication for the short data service.

Accordingly the embodiments herein provide a method for managing short data service (SDS) communication in a mission critical data (MCData) communication system. The method includes determining, by a transmitting MCData UE, whether a pre-determined criteria is met for transmitting a one-to-one standalone SDS message to a receiving MCData UE. Further, the method includes determining data size of the one-to-one standalone SDS message. Furthermore, the method includes transmitting the one-to-one standalone SDS message to the receiving MCData UE for one-to-one communication using one of a signaling control plane and a media plane based on the determined data size of the one-to-one standalone SDS message.

Accordingly the embodiments herein provide a method for managing short data service (SDS) communication in a mission critical data (MCData) communication system. The method includes determining, by a transmitting MCData UE, whether a pre-determined criteria is met for transmitting a group standalone SDS message to a receiving MCData UE. Further, the method includes determining, by the transmitting MCData UE, data size of the group standalone SDS message. Furthermore, the method includes transmitting, by the transmitting MCData UE, the group standalone SDS message to a plurality of receiving MCData UEs for a group communication using one of a signaling control plane and a media control plane based on the determined data size of the group standalone SDS message.

The proposed method and system provides an effective mechanism which considers various factors and then selects an appropriate protocol and method for MCData SDS. The proposed method allows selection of appropriate protocol by a MCData client at the transmitting MCData UE for SDS.

Referring now to the drawings, and more particularly to FIGS. 1 through 6, where similar reference characters denote corresponding features consistently throughout the figures, there are shown preferred embodiments.

FIGS. 1A-1D illustrate example on-network MCData communication systems for managing SDS communication, according to an embodiment as disclosed herein.

Before describing the embodiments, the MCData communication system is described herein briefly. In general, not shown in FIGS. 1A-1D, a MCData communication system 100 includes a transmitting MCData UE 102a, a group of receiving MCData UEs 102b-102n and a MCData server 104 in a network 106. The MCData server 104 serves as a centralized server to enable the network 106 to provide MCData service to MCData UEs 102a-102n.

In some examples, the network 106 includes 3GPP E-UTRAN access elements (not shown) and 3GPP E-UTRAN core elements (not shown). For example, the first MCData UE 102a gains access to the network 106 through a LTE-Uu interface (not shown) or through an evolved Node B (eNB, not shown). Further, the MCData server 104 may couple to various access/core elements of the network 106. For example, the MCData server 104 can couple to a serving gateway/packet data gateway through one or more suitable interface reference points. Various core elements such as mobile management entity (MME) and multimedia broadcast/multicast service gateway (MBMS GW) may provide core 3GPP E-UTRAN services to the MCData server 104 and/or the MCData UEs 102a-102n, to facilitate MCData communication services by the network 106.

In an embodiment, the MCData UEs 102a-102n can be for e.g., an electronic device, a User Equipment (UE), or the like. Each of the MCData UEs 102a-102n can include a MCData client (i.e., an application) for communicating with the MCData server 104. The first MCData UE 102a includes a first MCData client; the second MCData UE 102b includes a second MCData client and so on.

The MCData client residing at each of the MCData UEs 102a-102n, acts as user agent for all the MCData application transactions. The MCData client supports SDS, file distribution, data streaming and IP connectivity MCData capabilities utilized by MCData services like conversation management, robots control, enhanced status, database enquiries and secured internet.

The MCData server 104 provides centralized support for MCData services suite.

Conversation management, robots, enhanced status, database enquiries and secured internet MCData services requiring one-to-one data or group communication are realized using SDS, file distribution, data streaming and Internet Protocol (IP) connectivity MCData communication capabilities. All the MCData clients supporting users belonging to a single group are required to use the same MCData server 104 for that group. In one embodiment, HTTP is used as communication transport means for MCData communication.

Now Referring to FIG. 1A, the MCData communication system 100 includes the transmitting MCData UE 102a, the MCData server 104 in the network 106 and the receiving MCData UE 102b. The MCData server 104 facilitates/provides one-to-one unidirectional SDS communication between the transmitting MCData UE 102a and the receiving MCData UE 102b through the network 106.

Referring to FIG. 1B, the MCData communication system 100 includes the transmitting MCData UE 102a, the MCData server 104 in the network 106 and the group of receiving MCData UEs 102b-102n. The MCData server 104 provides group unidirectional SDS communication between the first MCData UE 102a and the group of second MCData UEs 102b-102n.

Referring to FIG. 1C, the MCData communication system 100 includes the transmitting MCData UE 102a, the MCData server 104 in the network 106 and the receiving MCData UE 102b.

The MCData server 104 provides one-to-one bidirectional SDS communication between the transmitting MCData UE 102a and the receiving MCData UE 102b.

Referring to FIG. 1D, the MCData communication system 100 includes the transmitting MCData UE 102a, the MCData server 104 in the network 106 and the group of receiving MCData UEs 102b-102n. The MCData server 104 provides bidirectional SDS communication between the transmitting MCData UE 102a and the group of receiving MCData UEs 102b-102n.

The various embodiments defining the criteria for protocol selection to transmit the SDS message (i.e., either one-to-one standalone SDS message or group SDS message) are described in the later parts of the description.

FIG. 2 is a functional model illustrating various entities in a MCData server and a MCData UE for an application plane in SDS communication, according to an embodiment as disclosed herein.

Referring to the FIG. 2, a MCData-SDS-1 reference point is used for uplink and downlink unicast SDS data transaction over a signaling control plane by a SDS distribution function of the MCData server 104 and SDS function of the MCData client which is within the first MCData UE 102a. Further, the MCData-SDS-1 reference point is also used for MCData application signaling during session establishment in support of a SDS data transfer.

A MCData-SDS-2 reference point is used to carry uplink and downlink unicast SDS data over a media plane between the SDS distribution function of the MCData server 104 and the SDS function of the first MCData UE 102a.

A MCData-SDS-3 reference point is used to carry downlink multicast SDS data over the media plane from the SDS distribution function of the MCData server 104 to the SDS function of the first MCData UE 102a.

The SDS data can be in the form of text, binary, application data, URL or combinations of these. In an example the SDS data can be at least one of information pertaining to applications (e.g. health parameters of first MCData UE 102a for situational awareness application); information pertaining to enhanced status service; text or URL data between multiple MCData users; application data (e.g. health parameters) to the first MCData UE 102a; location information (independent or along with user or application provided data); command instructions to invoke certain operations on the first MCData UE 102a (e.g. invoking UE specific applications); and application plane identities for the first MCData UE 102a and the MCData application.

A Transmission/Reception control element 104b is responsible for transmission and reception control of MCData between a transmitting MCData UE 102a, the MCData server 104, and a receiving MCData UE 102b. The transmission and reception control function is used to provide arbitration between multiple data requests and apply the necessary policy to ensure that appropriate data is transmitted between the multiple MCData UEs. For SDS, transmission/reception control may not apply due to small data messages, and the application of "auto-send" and "auto-receive" configurations. However, when the data requests are exceeding a certain size such as large blogs of data, files or streams, it may be necessary to control the data that is transmitted or received by the MCData UEs.

In an embodiment, SDS Variables can be, for e.g., MTU size-whether UDP/IP or TCP/IP is required, Auto-send size-whether data can be sent without "grant" from the server, and Auto-receive size-whether data can be sent to the recipient without "consent" from the recipient. The following are the considerations for the SDS.

1. MCData SDS only works with within one system.
2. Typically Maximum transmission unit (MTU) size for transmission using UDP/IP is 1300 bytes.
3. Maximum data size for SDS over signaling control plane and Maximum data size for auto-receive size are in service configuration.
4. The Group related Maximum data size for SDS over signaling control plane and Maximum data size for auto-receive parameters override the ones in service configuration for the case of group communication.
5. The transmitting MCData UE 102a checks the MTU size, Maximum data size for SDS over signaling control plane and Maximum data size for auto-receive for deciding on the use of signaling control plane.
6. The check for Maximum data size for auto-receive can only be performed by the transmitting MCData UE if the terminating user-id (or all group members of the group) are in the same mission critical organization as the originator.
7. In a single system, there could be cases that Maximum data size for SDS over signaling control plane is not equal to Maximum data size for auto-receive, hence a determination is made for these cases in 3GPP Rel-14.

FIG. 3 is a block diagram illustrating various hardware components of a transmitting MCData UE 102a for SDS communication, according to an embodiment as disclosed herein.

As depicted in the FIG. 3, the first MC Data UE 102a includes a communicator 302, a SDS manager 304, a processor 306 and a memory 308. In an embodiment, the SDS communicator 302 can be configured to transmit the one-to-one standalone message or the group standalone SDS message to second MCData UE(s) 102b-102n for one-to-one communication or the group communication when the pre-determined criteria is met and also utilizes either the signaling control plane or the media plane for transmitting the one-to-one standalone message or the group standalone SDS message to second MCData UE(s) 102b-102n. The SDS communicator 302 is coupled to the SDS manager 304 which performs various actions which includes determining the size of the one-to-one standalone SDS message or the group standalone SDS message and comparing the determined size with pre-configured parameters which include but not limited to the MTU size, Maximum data size for SDS over signaling control plane and Maximum data size for auto-receive in order to decide on the usage of signaling control plane or the media plane for transmitting the one-to-one standalone SDS message (i.e., for the one-to-one communication) or the group standalone SDS message for the group communication. Thus, the SDS manager 304 decides for the use of signaling control plane or the media plane based on the pre-configured parameters and indicates its decision to the SDS communicator 302. The SDS communicator 302, upon receiving the indication, transmits the one-to-one standalone message or the group standalone SDS message to the second MCData UE(s) 102b-102n either through the signaling control plane or through the media plane.

In an embodiment, the processor 306 (for example; a hardware unit, an apparatus, a Central Processing Unit (CPU), a Graphics Processing Unit (GPU), etc.) communicatively coupled to a memory 306 (e.g., a volatile memory and/or a non-volatile memory); the memory 306 includes storage locations configured to be addressable through the processor 306.

The memory 308 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 308 may, in some examples, be considered a non-transitory storage medium. The term "non-transitory" may indicate that the storage medium is not embodied in a carrier wave or a propagated signal. However, the term "non-transitory" should not be interpreted that the memory 308 is non-movable. In some examples, the memory 308 can be configured to store larger amounts of information than the memory. In certain examples, a non-transitory storage medium may store data that can, over time, change (e.g., in Random Access Memory (RAM) or cache).

FIG. 4 is a flow chart 400 illustrating a method for managing one-to-one SDS communication in the MCData communication system 100, according to an embodiment as disclosed herein. The various steps of the flow chart 400 are performed by the SDS manager 304 in the transmitting MCData UE 102a.

At step 402, the method includes determining whether a pre-determined criteria is met for transmitting the one-to-one standalone SDS message to a receiving MCData UE 102b. In an embodiment, the SDS manager 304 determines the pre-determined criteria by determining presence of one or more MCData SDS transmission control parameters for the one-to-one SDS communication. The MCData SDS transmission control parameters include but not limited to allow-to-transmit data, max-data-size-SDS-bytes and maximum amount of data for transmission in a single request. The SDS manager 304 determines the following condition. If the MCData user wishes to send one-to-one MCData communications and the <allow-transmit-data> element of an <actions> element is not present in the MCData user profile document or is present with the value "false" (as per the MCData user profile document in 3GPP TS 24.484), the transmitting MCData client and participating MCData function shall determine that the MCData user is not allowed to send MCData communications and shall not continue with the rest of the steps.

In an embodiment, the SDS manager 304 determines presence of the allow-to-transmit data in a MCData user profile configuration data for transmitting the one-to-one standalone SDS message to the receiving MCData UE 102b.

In another embodiment, the SDS manager 304 compares a size of the payload in the SDS message with a value associated with the max-data-size-SDS-bytes in MCData service configuration data for transmitting the one-to-one standalone SDS message to the receiving MCData UE. Further, the SDS manager 304 determines to transmit one-to-one standalone SDS message to the receiving MCData UE 102b when the size of the payload in the SDS message is less than the value associated with the max-data-size-SDS-bytes. The SDS manager 304 determines the following condition. If the MCData user wishes to send one-to-one SDS communications and the size of the payload is greater than the value contained in the <max-data-size-sds-bytes> element in the MCData service configuration document as specified in 3GPP TS 24.484, the MCData client and controlling MCData function shall determine that the MCData user is not allowed to send SDS communications due to message size.

In another embodiment, the SDS manager 304 determines to transmit the one-to-one standalone SDS message to the receiving MCData UE 102a in a single request message based on the size of the payload of the SDS message. Further, the SDS manager 304 decides to transmit the one-to-one standalone SDS message to the receiving MCData UE in a single request when the size of the payload of the SDS message is within the maximum amount of data for transmission in a single request. The SDS manager 304 determines the following condition. If the MCData user wishes to send one-to-one MCData communications to another MCData user and the size of the payload is greater than the maximum amount of data that the MCData user can transmit in a single request during one-to-one communications contained in the <MaxData1To1> element of the MCData user profile document (see the MCData user profile document in 3GPP TS 24.484), the MCData client and participating MCData function shall determine that the MCData user is not allowed to send one-to-one MCData communications due to exceeding the maximum amount of data that can be sent in a single request.

For group communication, the SDS manager 304 determines the pre-determined criteria by determining presence of one or more MCData SDS transmission control parameters for the group SDS communication. The MCData SDS transmission control parameters include but not limited to mcdata-allow-transmit-data to the group, mcdata-on-network-max-data-size-for-SDS and maximum amount of data for transmission in a single request to the group.

In an embodiment, the SDS manager 304 determines presence of the mcdata-allow-transmit-data to the group in MCData related group configuration data for transmitting the group standalone SDS message to the plurality of receiving MCData UEs. The SDS manager 304 determines the following condition. If the MCData user wishes to send group MCData communications on an MCData group identity and the <mcdata-allow-transmit-data-in-this-group> element of an <actions> element is not present in the MCData group document or is present with the value "false" as specified in 3GPP TS 24.481, the MCData client and controlling MCData function shall determine that the MCData user is not allowed to send group MCData communications on this group identity.

Further, the SDS manager 304 compares a size of the data in the SDS message with a value associated with the mcdata-on-network-max-data-size-for-SDS in MCData related group configuration data for transmitting the group standalone SDS message to the plurality of receiving MCData UEs. The SDS manager determines the following condition. If the MCData user wishes to send group SDS communications on an MCData group identity and the size of the data that the MCData user wishes to send is greater than the value contained in the <mcdata-on-network-max-data-size-for-SDS> element in the MCData group document for the MCData group ID as specified in 3GPP TS 24.481, then the MCData client and the controlling MCData function shall determine that the MCData user is not allowed to send SDS communications on this group identity due to message size.

In another embodiment, the SDS manager 304 determines to transmit the group standalone SDS message to the plurality of receiving MCData UEs when the size of the payload in the SDS message is less than the value contained in the mcdata-on-network-max-data-size-for-SDS.

In another embodiment, the SDS manager 304 determines to transmit the group standalone SDS message to the plurality of receiving MCData UEs in a single request message based on size of the payload of the SDS message.

Further, the SDS manager 304 transmits the group standalone SDS message to the receiving MCData UE in a single request when the size of the payload of the SDS message is within the maximum amount of data for transmission in the single request. The SDS manager 304 determines the following condition. If the MCData user wishes to send group MCData communications on an MCData group identity and the size of the payload is greater than the maximum amount of data that the MCData user can transmit in a single request during group communications in the group identified by the MCData group identity in the request contained in the <mcdata-max-data-in-single-request> element of the <entry> element of the MCData group document as specified in 3GPP TS 24.481, the MCData client and the controlling MCData function shall determine that the MCData user is not allowed to send group MCData communications on this group identity due to exceeding the maximum amount of data that can be sent in a single request.

At step 404, the method includes determining the data size of the one-to-one standalone SDS message. The method allows the SDS manager 304 to determine the data size of the one-to-one standalone SDS message.

At step 406, the method includes transmitting the one-to-one standalone SDS message to the receiving MCData UE 102b for one-to-one communication using one of the signaling control plane and a media plane based on comparison of the determined data size of the one-to-one standalone SDS message. The method allows the SDS manager 304 to transmit the one-to-one standalone SDS message to the receiving MCData UE 102b for one-to-one communication using one of the signaling control plane and a media plane based on the determined data size of the one-to-one standalone SDS message. The SDS manager compares the determined data size with one or more pre-configured parameters which include but not limited to MTU size, Maximum data size for SDS over signaling control plane and Maximum data size for auto-receive.

In an embodiment, the SDS manager 304 determines whether the data size of the one-to-one standalone SDS message or the group standalone SDS message is less than or greater than Maximum data size for SDS over signaling control plane. Further, the SDS manager 304 transmits the one-to-one standalone SDS message using one of the signaling control plane and the media plane in response to determining that the data size of the one-to-one standalone SDS message is less than or greater than Maximum data size for SDS over signaling control plane.

In an embodiment, the one-to-one standalone SDS message is transmitted using User Datagram Protocol (UDP) for signaling control plane when the determined size of the one-to-one standalone SDS message is less than MTU size and less than Maximum data size for SDS over signaling control plane.

In another embodiment, the SDS manager 304 transmits the one-to-one standalone SDS message using Transmission Control Protocol (TCP) for signaling control plane when the determined data size of the one-to-one standalone SDS message is greater than MTU size and less than Maximum data size for SDS over signaling control plane.

In another embodiment, the SDS manager 304 transmits the one-to-one standalone SDS message using media plane when the data size of the one-to-one standalone SDS message is greater than Maximum data size for SDS over signaling control plane.

In yet another embodiment, the SDS manager 304 transmits one-to-one standalone SDS message using media plane when the data size of the one-to-one standalone SDS message is greater than maximum data size for automatically receiving the SDS message (maximum-data-size-for-auto-receive).

In an embodiment, the transmitting MCData UE 102a is configured to perform the following steps as detailed below for selecting the signaling control plane or media plane for transmitting the one-to-one standalone SDS message to the receiving MCData UE 102b:

1. The transmitting MCData UE 102a determines data size against i.e., MTU size (which is typically 1300 bytes) and decides to transmit one-to-one standalone SDS using one of signaling plane or media plane, and the decision is whether the data size is less than or equal to MTU size, or greater than MTU size respectively.

2. If data size is within the MTU size, the transmitting MCData UE 102a checks against the Maximum data size for SDS over signaling control plane. If 1) indicates signaling plane, the transmitting MCData UE 102a further decides to send the one-to-one standalone SDS via signaling plane or media plane. In this case, the decision is whether data size is less than or equal to Maximum data size for SDS over signaling control plane, or greater than Maximum data size for SDS over signaling control plane.

3. If data size within Maximum data size for SDS over signaling control plane, then the transmitting MCData UE 102a checks Maximum data size for auto-receive: if 2) indicates signaling plane, then the transmitting MCData UE 102a further decides to transmit the one-to-one standalone SDS message via signaling plane or media plane. In this case, the decision is whether the data size is less than or equal to Maximum data size for auto-receive or greater than Maximum data size for auto-receive.

4. The transmitting MCData UE 102 transmits the one-to-one standalone SDS message via the Signaling plane if 3) indicates that data size less than or equal to Maximum data size for auto-receive. In this case, the transmitting MCData UE 102a has confirmed to itself that the data is possible to be sent end-to-end. The MCData client of the transmitting MCData UE 102a knows that the data can be sent automatically end-to-end to the receiving MCData UE 102b because Maximum data size for SDS over signaling control plane will not be rejected by the MCData server 104 and the determination for Maximum data size for auto-receive means that there is no user consent required by the receiving MCData client at the receiving MCData UE 102b.

The various embodiments for selecting the signaling plane or media plane for transmitting the one-to-one standalone SDS message to the receiving MCData UE 102b are detailed in conjunction with FIG. 5.

FIG. 5 is a flow chart 500 illustrating various steps involved in selection of signaling control plane or media plane for one-to-one SDS communication in the MCData communication system, according to an embodiment as disclosed herein. The various steps of the flow chart 500 are performed by the SDS manager 304 at the transmitting MCData UE 102*a*.

At step 502, the method includes determining the data size of the SDS message (i.e., the one-to-one standalone SDS message or the group standalone SDS message) At step 504, the method includes determining whether the data size of the SDS message is less than the MTU size (i.e., typically 1300 bytes). In case, it is determined that the data size of the SDS message is less than the MTU size, at step 506, the method includes determining that whether data size is less than the Maximum data size for SDS over the signaling control plane. In case, at step 506, it is determined that data size is less than the Maximum data size for SDS over the signaling control plane, at step 508, the method includes determining whether the data size is less than the Maximum data size for auto receive. In case, at step 508, it is determined that the data size is less than the Maximum data size for auto receive, then at step 510, the method includes transmitting the standalone SDS message using the User Datagram Protocol (UDP) for signaling control plane.

In case at step 508, it is determined that the data size is greater than the Maximum data size for auto receive, then at step 514, the method includes transmitting the standalone SDS message using the media plane.

In case, at step 506, it is determined that the it is determined that data size is greater than the Maximum data size for SDS over the signaling control plane, then at step 514, the method includes transmitting the standalone SDS message using the media plane.

In case at step 504, it is determined that the data size is greater than the MTU size, then at step 512, the method includes determining whether the data size is greater than the maximum data size for SDS over signaling control plane. If it is determined at step 512 that the data size is not greater than the maximum data size for SDS over signaling control plane, then at step 516, the method includes determining that the data size is greater than the maximum data size for auto receive. If at step 516, it is determined that the data size is less than the maximum data size for auto receive, then at step 518, the method includes transmitting the one-to-one standalone SDS message using TCP for signaling control plane.

In case, at step 516, it is determined that the data size is greater than the maximum data size for auto receive, then at step 514, the method includes transmitting the standalone SDS message using the media plane.

In case at step 504, it is determined that the data size is greater than the MTU size, then at step 512, the method includes determining whether the data size is greater than the maximum data size for SDS over signaling control plane. If it is determined at step 512 that the data size is greater than the maximum data size for SDS over signaling control plane, then at step 514, the method includes transmitting the standalone SDS message using the media plane.

Although the FIG. 5 is describing the various embodiments related to the transmission of the one-to-one standalone SDS message using one of the signaling control plane or the media plane, it should be noted that these embodiments shown in the FIG. 5 are also applicable for transmission of the group standalone SDS message using one of the signaling control plane or the media plane.

FIG. 6 is a flow chart 600 illustrating a method for managing group SDS communication in the MCData communication system 100, according to an embodiment as disclosed herein. The various steps of the flow chart 600 are performed by the SDS manager 304 at the transmitting MCData UE 102*a*.

At step 602, the method includes determining whether a pre-determined criteria is met for transmitting the group standalone SDS message to the plurality of receiving MCData UEs 102*b*-102*n*. In an embodiment, the SDS manager 304 determines the pre-determined criteria by determining presence of one or more MCData SDS transmission control parameters for the group SDS communication. The MCData SDS transmission control parameters include but not limited to mcdata-allow-transmit-data to the group, mcdata-on-network-max-data-size-for-SDS and maximum amount of data for transmission in a single request to the group.

In an embodiment, the SDS manager 304 determines presence of the mcdata-allow-transmit-data in a MCData related group configuration data for transmitting the group standalone SDS message to the receiving MCData UE 102*b*.

In another embodiment, the SDS manager 304 compares a size of the payload in the SDS message with a value associated with the mcdata-on-network-max-data-size-for-SDS in MCData group configuration data for transmitting the group standalone SDS message to the receiving MCData UE 102*b*. Further, the SDS manager 304 decides to transmit the group standalone SDS message to the receiving MCData UE 102*b* when the size of the payload in the SDS message is less than the value associated with the mcdata-on-network-max-data-size-for-SDS.

In another embodiment, the SDS manager 304 determines to transmit the group standalone SDS message to the receiving MCData UE 102*a* in a single request message in a single request when the data size of the payload of the SDS message is within the maximum amount of data for transmission in a single request. The SDS manager 304 decides to transmit the group standalone SDS message to the receiving MCData UE in a single request when in a single request when the data size of the payload of the SDS message is within the maximum amount of data for transmission in a single request.

At step 604, the method includes determining the data size of the group standalone SDS message. The method allows the SDS manager 304 to determine the data size of the group standalone SDS message.

At step 606, the method includes transmitting the group standalone SDS message to the one or more receiving MCData UEs 102*b*-102*n* for the group communication using one of the signaling control plane and the media plane based on the determined data size of the group standalone SDS message. The method allows the SDS manager 304 transmit the group standalone SDS message to the receiving MCData UEs 102*b*-102*n* for group communication using one of the signaling control plane and the media plane based on the determined data size of the group standalone SDS message. The determined size of the group standalone SDS message is compared with one or more pre-configured parameters which include but not limited to MTU size, Maximum data size for SDS over signaling control plane and Maximum data size for auto-receive.

In an embodiment, the SDS manager 304 determines whether the data size of the group standalone SDS message is less than or greater than Maximum data size for SDS over signaling control plane. Further, the SDS manager 304 transmits the group standalone SDS message using one of the signaling control plane and the media plane in response to determining that the size of the group standalone SDS message is less than or greater than Maximum data size for SDS over signaling control plane.

In an embodiment, the group standalone SDS message is transmitted using User Datagram Protocol (UDP) for signaling control plane when the determined size of the group standalone SDS message is less than MTU size and less than Maximum data size for SDS over signaling control plane.

In another embodiment, the SDS manager 304 transmits the group standalone SDS message using Transmission Control Protocol (TCP) for signaling control plane when the determined data size of the group standalone SDS message is greater than MTU size and less than Maximum data size for SDS over signaling control plane.

In another embodiment, the SDS manager 304 transmits the group standalone SDS message using media plane when the data size of the group standalone SDS message is greater than Maximum data size for SDS over signaling control plane.

In yet another embodiment, the SDS manager 304 transmits group standalone SDS message using media plane when the data size of the group standalone SDS message is greater than maximum data size for automatically receiving the SDS message (maximum-data-size-for-auto-receive).

The various scenarios in which the transmitting MCData UE selects the signaling plane or media plane for transmitting the one-to-one standalone SDS message to the receiving MCData UE 102b are as detailed below.

For all scenarios, even though the transmitting MCData UE 102a is able to check Maximum data size for SDS over signaling control plane and Maximum data size for auto-receive, the actual data size check for Maximum data size for SDS over signaling control plane is still performed at the MCData server 104 and the actual data size check for Maximum data size for auto-receive (consent) is still performed at the receiving MCData UE 102b.

The MCData server 104 can always reject the sending of the data via the signaling plane for rare cases where the transmitting MCData UE 102a does not comply with the determinations of Maximum data size for SDS over signaling control plane and Maximum data size for auto-receive. For the Maximum data size for auto-receive case, this prevents the SIP MESSAGE being sent to the receiving MCData UE 102b when it is likely not to be accepted.

If the media plane is selected upon, the MCData server 104 and the receiving MCData UE 102b can only perform data size checks (against Maximum data size for SDS over signaling control plane and Maximum data size for auto-receive) when the media plane has been set up and the data has been transmitted.

Thus, when the SIP INVITE is transmitted, the MCData server 104 just forwards the SIP INVITE to the receiving MCData UE 102b (i.e., terminating user); and the terminating user will just accept the SIP INVITE.

Once the media plane is established and if the transmitting MCData UE's 102a data size is less that Maximum data size for SDS over signaling control plane, the transmitting MCData UE 102a can transmit the data to the MCData server 104 and if the transmitting MCData UE's data size is greater than the Maximum data size for SDS over signaling control plane, then the transmitting MCData UE requests for a grant from the MCData server 104 before transmitting the data.

The various scenarios in which the transmitting MCData UE selects the signaling plane or media plane for transmitting the one-to-one standalone SDS message to the receiving MCData UE 102b are detailed in the below Table 1.

TABLE 1

| Scenario | Data size > Max data size for SDS(MTU size) | Data size > Max data Size for SDS over Signaling Control plane | Data size > maximum data size for auto-receive | Use Signaling Plane or Media Plane? |
|---|---|---|---|---|
| 1 | No | No | No | Signaling control Plane(using UDP) |
| 2 | No | No | Yes | Media Plane |
| 3 | No | Yes | No | Media Plane |
| 4 | No | Yes | Yes | Media Plane |
| 5 | Yes | No | No | Signaling control Plane(using TCP) |
| 6 | Yes | No | Yes | Media Plane |
| 7 | Yes | Yes | No | Media Plane |
| 8 | Yes | Yes | Yes | Media Plane |

There may be other factors that may influence use of media plane e.g., security mechanisms to protect signaling and payload.

The following sections describe the procedures at the originating MCData client, MCData server (i.e., originating participating function, controlling function and terminating participating function) and the terminating MCData client.

The following describes the selection criteria for one-to-one SDS communications. The transmitting MCData UE 102a shall determine whether the SDS message is sent via the signaling plane or media plane by following the procedure below:

1. if the size of the data that the MCData user wishes to send is greater than <maximum-data-size-for-auto-send> specified in the MCData service configuration document (see the MCData service configuration document in 3GPP TS 24.484), then the transmitting MCData UE 102a shall use the media plane for one-to-one SDS communications and shall not continue with the remaining steps;

2. if the size of the data that the MCData user wishes to send is greater than <maximum-data-size-for-auto-receive> specified in the MCData service configuration document (see the MCData service configuration document in 3GPP TS 24.484) then the transmitting MCData UE 102a shall use the media plane for one-to-one SDS communications and shall not continue with the remaining steps;

3. if the receiving MCData UE 102b is not part of the same mission critical organisation as the transmitting MCData UE 102a, then the transmitting MCData UE 102 shall use the media plane for one-to-one SDS communications and shall not continue with the remaining steps; and 4. The transmitting MCData UE 102 shall use the signaling plane for one-to-one SDS communications and shall not continue with the remaining steps.

For group SDS communications, the transmitting MCData UE 102a shall determine whether the SDS message is sent via the signaling plane or media plane by following the procedure below:

1. if the size of the data that the MCData user wishes to send is greater than <maximum-data-size-for-auto-send> specified in the MCData group document associated with the MCData group ID (see the MCData group document in 3GPP TS 24.481), then the transmitting MCData UE 102a shall use the media plane for group SDS communications and shall not continue with the remaining steps;

2. if the size of the data that the transmitting MCData UE 102a intends to send is greater than <maximum-data-size-for-auto-receive> specified in the MCData group document (see the MCData group document in 3GPP TS 24.481), then the transmitting MCData UE 102a shall use the media plane for group SDS communications and shall not continue with the remaining steps;

3. If there exists at least one MCData UE of the group which is part of a different mission critical organisation to that of the transmitting MCData UE 102a, then the transmitting MCData UE 102a shall use the media plane for group SDS communications and shall not continue with the remaining steps.

4. The transmitting MCData UE 102 shall use the signaling plane for group SDS communications and shall not continue with the remaining steps.

For group SDS communications, the controlling MCData function shall verify that the MCData UE can use the signaling plane to transfer data by following the procedure below:

1. if the size of the data received is greater than <maximum-data-size-for-auto-send> specified in the MCData group document associated with the MCData group ID (see the MCData group document in 3GPP TS 24.481), then the controlling MCData function shall determine that the MCData user not allowed to initiate group MCData communications via the signaling plane due to exceeding auto-send size, and shall not continue with the rest of the steps in this paragraph;

2. if the size of the data received is greater than <maximum-data-size-for-auto-receive> specified in the MCData group document (see the MCData group document in 3GPP TS 24.481), then the controlling MCData function shall determine that the MCData user is not allowed to initiate group MCData communications via the signaling plane due to exceeding auto-receive size, and shall not continue with the rest of the steps in this paragraph;

3. if there exists at least one MCData user of the group which is part of a different mission critical organisation to that of the originating MCData user, then the controlling MCData function shall determine that the MCData user not allowed to initiate group MCData communications via the signaling plane due to the inability to determine the auto-receive size, and shall not continue with the rest of the steps in this paragraph.

4. The controlling MCData function shall allow the use of the signaling plane for group SDS communications.

The procedure for sending the SDS message is as detailed below.

For e.g., in the following procedures, the size of a standalone SDS message refers to the overall size of message which includes the SIP header fields, application signaling and application payload.

When the transmitting MCData UE 102a intends to send:
a one-to-one standalone SDS message to another MCData user; or a group standalone SDS message to a pre-configured group or to particular members of the pre-configured group.

the transmitting MCData UE 102a shall perform the following steps:

a) if the size of the standalone SDS message is less than or equal to MTU size (i.e. typically 1300 bytes), then for the SDS communications transmitting the one-to-one standalone SDS message is transmitted using signaling control plane. Further, the transmitting MCData UE 102 shall follow the MCData client originating procedures using SIP MESSAGE; and in case it is indicated that the media plane should be used for SDS communications as described in various scenarios in FIG. 5, the transmitting MCData UE 102a shall follow the Standalone SDS using media plane procedures;

b) if size of the standalone SDS message is greater than MTU size (i.e. typically 1300 bytes), the transmitting MCData UE 102a shall follow the Standalone SDS using media plane.

When the transmitting MCData UE 102a intends to:
initiate a Short Data Service (SDS) session with another MCData user, or
initiate a group Short Data Service (SDS) session to a pre-configured group or to particular members of the pre-configured group;
the MCData client shall follow the SDS session procedures.

The transmitting MCData UE's participating MCData function procedures are detailed below.

Upon receipt of a "SIP MESSAGE request for standalone SDS for originating participating MCData function", the participating MCData function does the following checks for transmission and reception control:

1. if the message size is larger than MTU size (i.e. typically 1300 bytes), shall reject the "SIP MESSAGE request for standalone SDS for originating participating MCData function" with a SIP 403 (Forbidden) response to the SIP MESSAGE request, with warning text set to "message too large to send over signaling control plane" in a Warning header field, and shall not continue with the rest of the steps in this paragraph 2. if the user identified by the MCData ID:
   (a) is not allowed to initiate MCData communications, shall reject the "SIP MESSAGE request for standalone SDS for originating participating MCData function" with a SIP 403 (Forbidden) response to the SIP MESSAGE request, with warning text set to "user not authorised to transmit data" in a Warning header field, and shall not continue with the rest of the steps in this paragraph; and
   (b) is not allowed to initiate one-to-one MCData communications due to message size, shall reject the "SIP MESSAGE request for standalone SDS for originating participating MCData function" with a SIP 403 (Forbidden) response to the SIP MESSAGE request, with warning text set to "user not authorised for one-to-one MCData communications due to message size" in a Warning header field, and shall not continue with the rest of the steps in this paragraph.
   (c) is not allowed to initiate one-to-one MCData communications via the signaling plane due to exceeding auto-send size, shall reject the SIP MESSAGE request by sending a SIP 403 (Forbidden) response with the warning text set to "data size greater than auto-send size" in a Warning header field, and shall not continue with the rest of the steps in this paragraph.
   (d) is not allowed to initiate one-to-one MCData communications via the signaling plane due to exceeding auto-receive size, shall reject the SIP MESSAGE request by sending a SIP 403 (Forbidden) response with the warning text set to "data size greater than auto-receive size" in a Warning header field, and shall not continue with the rest of the steps in this paragraph, and (e) is not allowed to initiate one-to-one MCData communications via the signaling plane due to the inability to determine the auto-receive size for the terminating MCData user shall reject the SIP MESSAGE request by sending a SIP 403 (Forbidden) response with the warning text set to "unable to determine auto-receive size" in a Warning header field, and shall not continue with the rest of the steps in this paragraph.

Otherwise shall generate and send a SIP MESSAGE request in accordance with 3GPP TS 24.229 and IETF RFC 3428.

FIG. 7 is a block diagram illustrating the MCData UE according to an embodiment as disclosed herein.

Referring to the FIG. 7, the MCData UE 700 may include a processor 710, a transceiver 720 and a memory 730. However, all of the illustrated components are not essential. The MCData UE 700 may be implemented by more or less components than those illustrated in FIG. 7. In addition, the processor 710 and the transceiver 720 and the memory 730 may be implemented as a single chip according to another embodiment.

The aforementioned components will now be described in detail.

The processor 710 may include one or more processors or other processing devices that control the proposed function, process, and/or method. Operation of the transmitting MCData UE or receiving MCData UE may be implemented by the processor 710. The term "transmitting" and "receiving" herein are used merely for labeling purpose and can be used interchangeably without departing from the scope of the embodiments.

The processor 710 may identify SDS disposition request type Information Element (IE) in a SDS message received from a transmitting MCData UE. The processor 710 may initiate a timer when the disposition request type Information Element (IE) is set as Delivery and Read. The processor 710 may transmitting a consolidated disposition notification through the transceiver 720 to the transmitting MCData UE by stopping the timer when the SDS message is read before expiry of the timer.

The transceiver 720 may include a RF transmitter for up-converting and amplifying a transmitted signal, and a RF receiver for down-converting a frequency of a received signal. However, according to another embodiment, the transceiver 720 may be implemented by more or less components than those illustrated in components.

The transceiver 720 may be connected to the processor 710 and transmit and/or receive a signal. The signal may include control information and data. In addition, the transceiver 720 may receive the signal through a wireless channel and output the signal to the processor 710. The transceiver 720 may transmit a signal output from the processor 1010 through the wireless channel.

The memory 730 may store the control information or the data included in a signal obtained by the MCData UE 700. The memory 730 may be connected to the processor 710 and store at least one instruction or a protocol or a parameter for the proposed function, process, and/or method. The memory 730 may include read-only memory (ROM) and/or random access memory (RAM) and/or hard disk and/or CD-ROM and/or DVD and/or other storage devices.

The embodiments disclosed herein can be implemented through at least one software program running on at least one hardware device and performing network management functions to control the elements. The elements shown in FIGS. 1 through 6 include blocks which can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for managing short data service (SDS) communication in a mission critical data (MCData) communication system, by a MCData user equipment (UE), the method comprising:
   identifying a presence of allow-to-transmit data in MCData user profile configuration data for transmitting a one-to-one standalone SDS message to a receiving MCData UE;
   identifying a size of a payload of the one-to-one standalone SDS message based on the presence of the allow-to-transmit data and maximum amount of data for a single request; and
   in case that the size of the payloads of the one-to-one standalone SDS message is not greater than the maximum amount of data for the single request, transmitting the one-to-one standalone SDS message to the receiving MCData UE in the single request using one of a signaling control plane or a media plane,
   wherein the transmitting the one-to-one standalone SDS message comprises:
   in case that the size of the payload is less than or equal to maximum payload size for the signaling control plane, transmitting the one-to-one standalone SDS message using the signaling control plane, and
   in case that the size of the payload is greater than maximum payload size for the signaling control plane, transmitting the one-to-one standalone SDS message using the media plane.

2. The method of claim 1, further comprising in case that the size of the payload is less than or equal to a value regarding max-data-size-SDS-bytes, determining to transmit the one-to-one standalone SDS message to the receiving MCData UE.

3. A mission critical data (MCData) user equipment (UE) for managing short data service (SDS) communication in a MCData communication system, the MCData UE comprises a SDS manager configured to:
   identify a presence of allow-to-transmit data in MCData user profile configuration data for transmitting a one-to-one standalone SDS message to a receiving MCData UE;
   identify a size of a payload of the one-to-one standalone SDS message, based on the presence of the allow-to-transmit data and maximum amount of data for a single request; and
   in case that the size of the payloads of the one-to-one standalone SDS message is not greater than the maximum amount of data for the single request, transmit the one-to-one standalone SDS message to the receiving MCData UE in the single request, using one of a signaling control plane and a media plane, wherein the SDS manager is configured to:
in case that the size of the payload is less than or equal to maximum payload size for the signaling control plane, transmit the one-to-one standalone SDS message using the signaling control plane, and in case that the size of the payload is greater than maximum payload size for the signaling control plane, transmit the one-to-one standalone SDS message using the media plane.

4. The transmitting MCData UE of claim 3, wherein the SDS manager is configured to in case that the size of the payload is less than or equal to a value regarding max-data-size-SDS-bytes, determining to transmit the one-to-one standalone SDS message to the receiving MCData UE.

* * * * *